W. H. KUNZ.
COLOR PHOTOGRAPHY.
APPLICATION FILED AUG. 21, 1914.
1,320,625.
Patented Nov. 4, 1919.
2 SHEETS—SHEET 1.
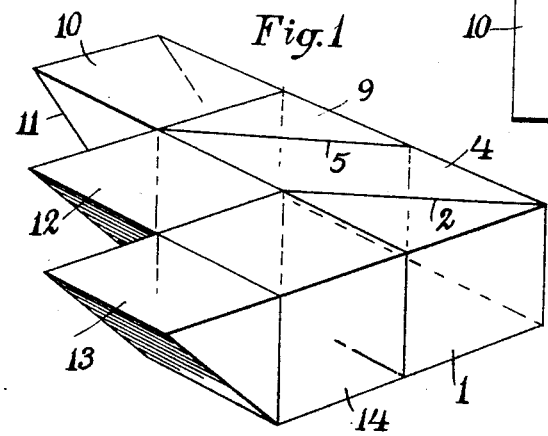
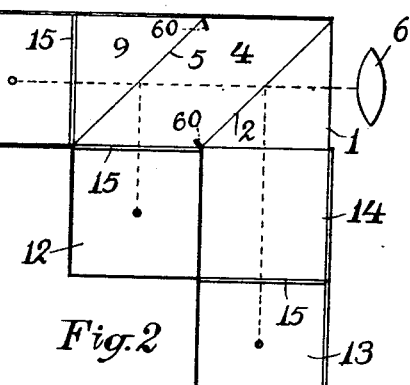
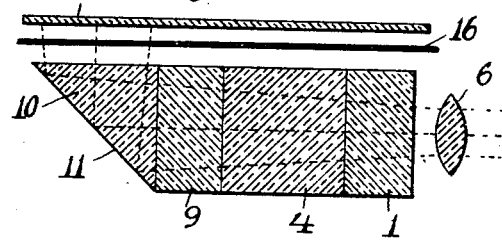
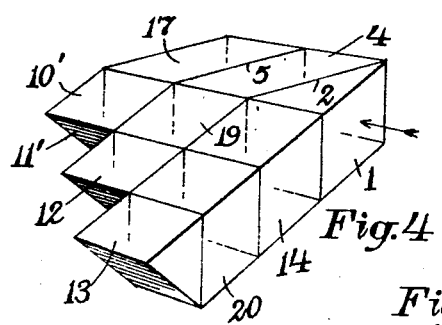
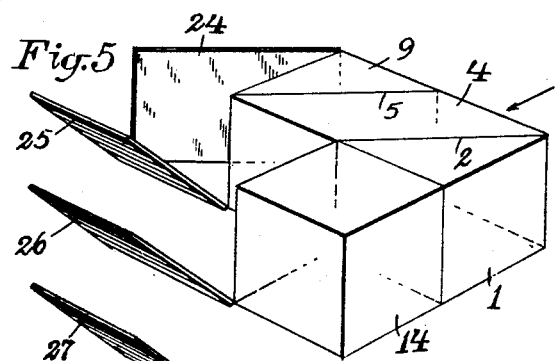
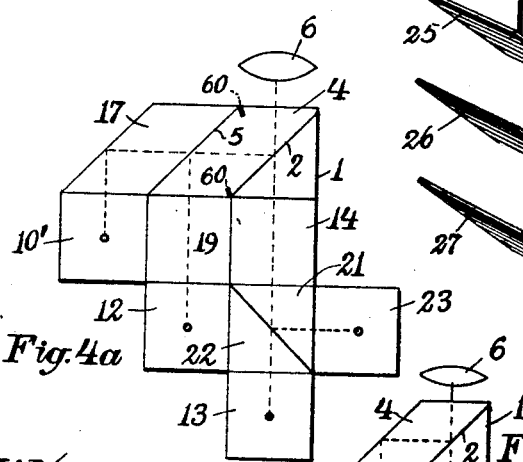
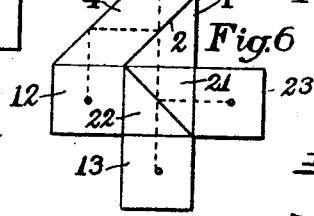
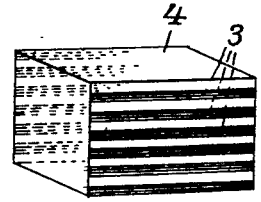
Witnesses:
Inventor,
William H. Kunz;
By A. B. Upham.
Attorney.

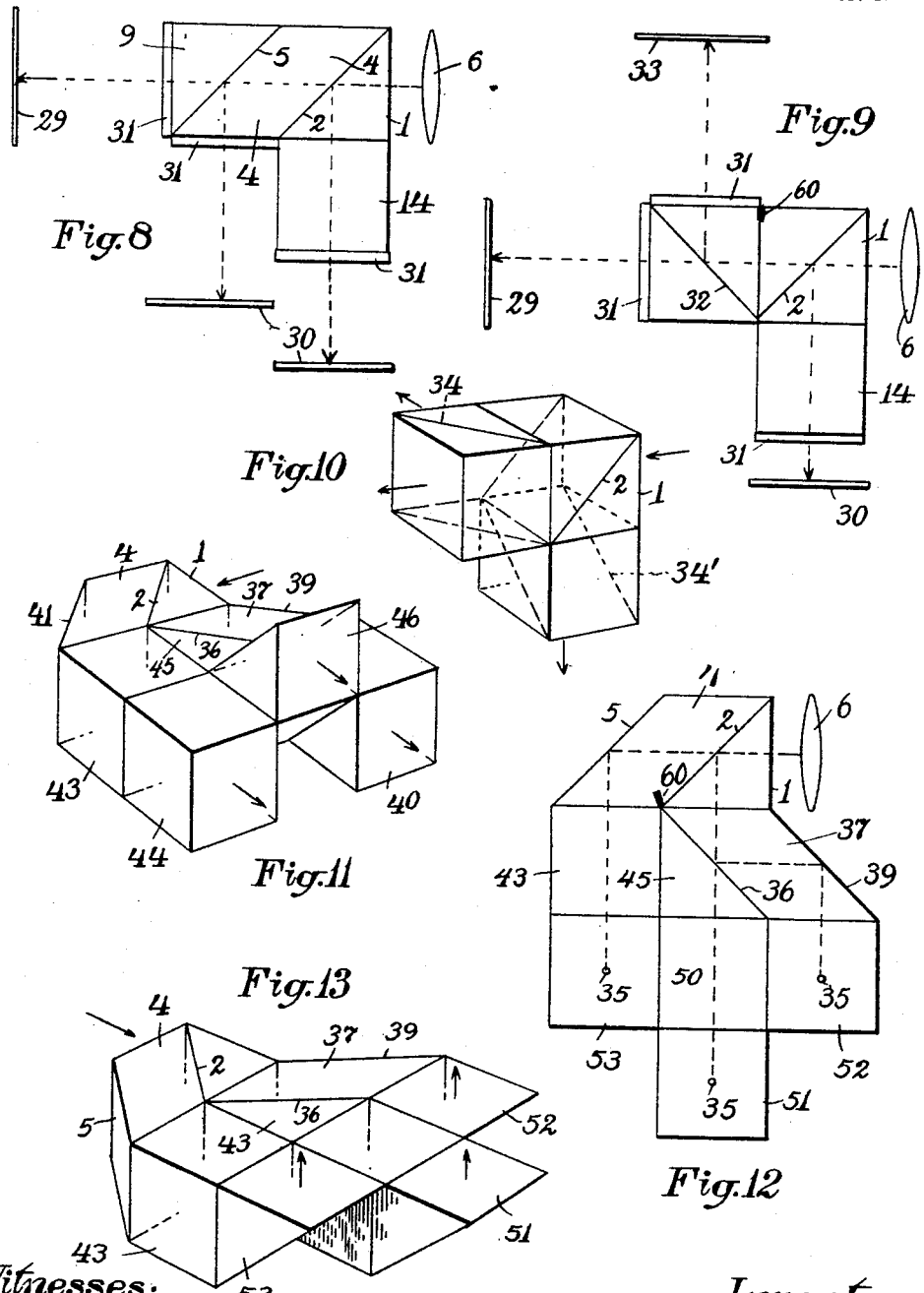

UNITED STATES PATENT OFFICE.

WILLIAM H. KUNZ, OF BOSTON, MASSACHUSETTS, ASSIGNOR TO KUNZ-GARNISS COMPANY, A CORPORATION OF MASSACHUSETTS.

COLOR PHOTOGRAPHY.

1,320,625.      Specification of Letters Patent.      Patented Nov. 4, 1919.

Application filed August 21, 1914. Serial No. 857,961.

*To all whom it may concern:*

Be it known that I, WILLIAM H. KUNZ, a citizen of the United States, and a resident of Boston, in the county of Suffolk and Commonwealth of Massachusetts, have invented certain new and useful Improvements in Color Photography, of which the following is a full, clear, and exact description.

While multi-color photography, wherein mirrors are employed, gives quite good results for many lines of work, yet for motion pictures which must be magnified manyfold in being cast upon a screen, the double reflection from their surfaces and the distortion of image caused by the mirrors become very objectionable.

To avoid such troubles I have devised means whereby prismatic reflectors may be employed, and in a manner to provide a light path for all the pictures, traversing equal amounts of glass of like refractive index.

While I have disclosed in my companion application Serial No. 852,720 a construction which accomplishes substantially the same results as do the several forms herein set forth, yet my present disclosure appears to be equally efficient and in some respects more practical for motion picture work.

The essential feature of the several forms of the present invention comprises a prism having substantially parallel opposite faces obliquely disposed relative to adjacent faces, one or more of the oblique surfaces being made wholly or partially reflecting.

Referring to the drawings forming part of this specification, Figure 1 is a perspective view of an arrangement of prisms wherein triplicate pictures would all be taken upon the same sensitive plate parallel with the top face of the grouped prisms. Fig. 2 is a plan view of the same. Fig. 3 is a sectional view of the same through the lens. Fig. 4 is a perspective view of a slightly modified construction wherein all of the triplicate pictures will appear upon the sensitive plate right side up. Fig. 4ª is plan view of a construction similar to that shown in Fig. 4, but differing therefrom in its location of the lens, and also in illustrating the prisms adapted for four-color work. Fig. 5 is a perspective view of a construction similar to that in Fig. 4 but showing mirrors substituted for certain of the prismatic reflectors. Fig. 6 is a plan view of a three color device further modified. Fig. 7 is a perspective view of an oblique quadrilateral prism provided with partial reflecting surfaces. Fig. 8 is a plan view of a construction wherein but two of the triplicate images are on the same plate. Fig. 9 is a plan view of a construction having no two of the triplicate pictures taken on the same plane. Fig. 10 is a perspective view of still another construction in which no two of the pictures are taken on the same plate. Fig. 11 is a perspective view of a construction wherein all three pictures are taken on the same plate. Fig. 12 is a plan view of a construction where the dry plate is located above the prisms. Fig. 13 is a perspective view of the same.

In the construction illustrated in Figs. 1 and 2, there are five right-angled forty-five degree prisms, one cubical block, and one oblique prism, all of the same kind of glass and cemented together in the manner shown, and having two of the cemented surfaces made partially reflecting. The right-angled prism 1 has its oblique surface 2 made partially reflecting by means of metal, as silver, platinum or the like, applied either in a very thin coating, or in stripes 3, as illustrated in Fig. 7.

The oblique prism 4 has its surface 5 made partially reflecting, either by a thin coating or stripes 3, as already described, but in case stripes are applied the same must be offset with respect to those on the surface of said prism 1, and they must also be narrower by approximately one-half in order that the light rays which pass between the stripes on the surface 2 may partially pass between the stripes on the prism 4 and may partially be reflected. Moreover, the stripes 3 on the surface 2 should be substantially one-third the width of the spaces between them, so that approximately one-third of the light shall be diverted and two-thirds may be permitted to pass through to the surface 5.

While theoretically one-third of the rays coming from the lens 6 should thus be apportioned to each of the three sensitive plates upon which the triplicate photographs are taken, such proportion must be materially changed to accord with the actinic value of the different color filters, and the color sensitiveness of the plates used.

To the striped surface 5 of the prism 4 is cemented a triangular prism 9, and to the latter a forty-five degree prism 10 positioned with its oblique surface 11 underneath, and also rendered fully reflective by being suitably metallized, in order that the light rays from the lens 6 which reach said surface are reflected vertically upward, as indicated in Fig. 3. A prism 12, which is like the prism 10 and similarly metallized, is cemented to the end of the oblique prism 4 for diverting upward the light rays reflected from the oblique surface 5; and a like prism 13 is provided for reflecting upward the rays reflected from the stripes on the surface 2. To furnish a focal length equal to that of the other two photographs, and also to provide equal amounts of glass for the paths of the light-rays, a glass cube 14 is cemented between the prisms 1 and 13.

In this manner three like photographs can be taken upon the same sensitive plate 7. To adapt the same for color work, color filters are introduced into the paths of the rays, either between the reflector prisms 10, 12 and 13 and the remainder of the glass, as shown in Fig. 2 at 15, or above said prisms, as shown at 16 in Fig. 3.

The only objection to above described construction is that the picture taken through the prism 10 will be reversed as compared with the pictures taken through the prisms 12 and 13. To correct this, a second oblique prism 17 is cemented to the first oblique prism 4 in the place of the triangular prism 9, as is shown in Fig. 4, and then the prism 10' is applied to the end of the oblique prism 17 to present its silvered surface 11' parallel with the silvered surfaces of the prisms 12 and 13. The outer oblique surface of the prism 17 is metallized to render it wholly reflecting, so that the rays which in the other construction went to the prism 10 in a straight line from the lens, are now turned at right angles and are then reflected upward to the sensitive plate by the said surface 11'.

Inasmuch as this lengthens the focal length of the rays through the prism 10', both in space and in glass, glass cubes 19 and 20 are introduced in the paths of the rays to the two prisms 12 and 13, respectively.

Fig. 4ᵃ illustrates a modified form of the construction set forth in Fig. 4, wherein the lens 6 is changed to a point where the rays through it are delivered into the end of the oblique prism 4, thereby rendering it necessary to metallize both of the latter's oblique surfaces, but making it more practical to convert the device into a four-color camera. This is done by the addition of the two right angled prisms 21, 22, one of which has its oblique surface made partially reflecting to divert a part of the rays which would otherwise pass to the prism 13, to a laterally positioned reflecting prism 23 by which said diverted rays are directed upward to a fourth section of the sensitive plate.

Fig. 5 differs in its showing from the structure illustrated in Fig. 4 by the substitution of mirrors for certain of the prismatic reflectors; the mirror 24 taking the place of the oblique prism 17 and its silvered surface; and the mirrors 25, 26 and 27 taking the place of the reflector prisms 10', 12 and 13. Here air-spaces take the place of the glass cubes 19, 20.

In the constructions shown in Figs. 8, 9 and 10, less glass is required than in some of the above described devices, but the sensitive plates must be located in two or more different planes. Fig. 8 illustrates an arrangement wherein both oblique surfaces of the prism 4 are partially reflecting, so that a part of the rays pass straight on through a triangular prism 9 to a sensitive plate 29; while the rays which are diverted by said partially reflecting surfaces, go to a sensitive plate 30. Color filters 31 cemented or otherwise secured to the surfaces from which the light-rays emerge, adapt this camera for three color work.

In Fig. 9, four right angled prisms are shown as grouped to present a partially reflecting surface 32 for diverting a portion of the rays to a sensitive plate 33 at the opposite side of the prisms from the plate 30, but otherwise it is similar to the device shown in Fig. 8.

Instead of having all the plates perpendicular to one plane, as shown in Figs. 8 and 9, one or more partially reflecting surfaces 34, 34' may be disposed for diverting portions of the light-rays in directions perpendicular to the plane traversed by the rays emerging from the other two surfaces of the device, as indicated in the construction illustrated in Fig. 10.

Figs. 11, 12 and 13 illustrate constructions wherein triplicate photographs are taken on a common sensitive plate, the centers of position of which photographs are in the three small circles 35 in Fig. 12. In this case, the rays which are deflected by the partially reflecting surface 2, are partially deflected by the partially reflecting surface 36 of the oblique prism 37, and then wholly diverted by the reflecting surface 39.

In the construction shown in Fig. 11, the rays from the reflecting surface 39 pass straight on through a cube 40, and the rays reflected from the wholly reflecting surface 41 of the oblique prism 42, pass directly through the two glass cubes 43, 44 to a common sensitive plate not illustrated. To give a path through space and glass for the rays not diverted by the partially reflecting surface 36, which shall equal those of the other two sets of rays, a triangular prism 45 is cemented to the surface 36 of the prism 37, and an oblique prism 46 is cemented to the vertical surface of said prism 45. Both oblique surfaces of said prism 46 are made wholly reflecting, and thereby cause the rays to be diverted first upward and then horizontally to the sensitive plate. In this case, the sensitive surface is supposed to be parallel with the surfaces from which the small arrows are illustrated as emerging.

In the structure shown in Figs. 12 and 13, a cube 50 is cemented to the triangular prism 45, and an upwardly reflecting prism 51 is cemented to said cube; the cubes 40, 44 of the structure shown in Fig. 11 being replaced by upwardly reflecting prisms 52, 53. The light rays may come either from the direction of the arrow shown in Fig. 13, or from the lens 6 shown in Fig. 12, but in each case the sensitive surface is parallel with the top of the prismatic arrangement, and color filters are provided for the emerging light rays in any of the above described ways.

The construction illustrated in Fig. 6 differs from that shown in Fig. 4ª in the removal of the prisms 17 and 10', and of the cubes 19 and 14, thereby converting the same into a three color camera.

To insure that no rays shall be refracted from the lens 6 to points at the extremities of the partially reflecting surfaces and thence to undesigned points whereby double images may be produced on a sensitive surface, I saw a small slot 60 into certain corners of certain prisms, and fill them with opaque material. These are shown in Figs. 2, 4ª, 9 and 12.

What I claim is:

1. Apparatus for multi-color photography comprising a lens, a glass prism in the form of an oblique parallelepiped, a triangular prism having its hypotenuse cemented to an oblique surface of the first-named prism, both oblique surfaces being reflecting, the one cemented to the triangular prism being but partially so, a glass block cemented to said triangular prism on the face farthest from the lens, and means for supporting sensitive surfaces for the direct and reflected rays.

2. Apparatus for multi-color photography comprising a lens, a glass prism in the form of an oblique parallelepiped, two triangular prisms each having its hypotenuse cemented to an oblique surface of the first-named prism, both oblique surfaces being partially reflecting, a glass block cemented to the triangular prism nearest said lens and to the surface of the same farthest from the lens, and means for supporting sensitive surfaces at the foci of the direct and reflected rays.

In testimony that I claim the foregoing invention, I have hereunto set my hand this 19th day of August, 1914.

WILLIAM H. KUNZ.

Witnesses:
A. B. UPHAM,
EDWIN SHIVELL.

Copies of this patent may be obtained for five cents each, by addressing the "Commissioner of Patents, Washington, D. C."